US009680739B2

(12) United States Patent
Nakao

(10) Patent No.: US 9,680,739 B2
(45) Date of Patent: Jun. 13, 2017

(54) INFORMATION TRANSMISSION SYSTEM, INFORMATION COMMUNICATION APPARATUS, AND INFORMATION TRANSMISSION APPARATUS

(71) Applicant: THE UNIVERSITY OF TOKYO, Tokyo (JP)

(72) Inventor: Akihiro Nakao, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 163 days.

(21) Appl. No.: 14/611,017

(22) Filed: Jan. 30, 2015

(65) Prior Publication Data

US 2015/0222529 A1   Aug. 6, 2015

(30) Foreign Application Priority Data

Jan. 31, 2014   (JP) .................................. 2014-017959

(51) Int. Cl.
| | |
|---|---|
| *H04L 12/28* | (2006.01) |
| *H04L 12/56* | (2006.01) |
| *H04L 12/721* | (2013.01) |
| *H04L 12/741* | (2013.01) |
| *H04L 12/725* | (2013.01) |

(52) U.S. Cl.
CPC ............ *H04L 45/38* (2013.01); *H04L 45/306* (2013.01); *H04L 45/745* (2013.01)

(58) Field of Classification Search
CPC ...... H04L 45/38; H04L 45/306; H04L 45/745
USPC .................................................. 370/392, 389
See application file for complete search history.

(56) References Cited

U.S. PATENT DOCUMENTS

| | | | | |
|---|---|---|---|---|
| 7,885,248 B2* | 2/2011 | Harper | .................. | H04W 8/082 370/328 |
| 8,144,684 B2* | 3/2012 | Harper | .................. | H04W 8/082 370/328 |
| 2002/0184628 A1* | 12/2002 | Kim | ..................... | H04N 5/4401 725/41 |
| 2007/0253371 A1* | 11/2007 | Harper | .................. | H04W 8/082 370/331 |

(Continued)

FOREIGN PATENT DOCUMENTS

WO   2010/103909 A1   9/2010

*Primary Examiner* — Chuong T Ho

(57) ABSTRACT

The information which can be acquired at the information communication apparatus side is treated as additional information. The information communication apparatus transmits the additional information and packet data, and the information transmission apparatus communicably connected to the information communication apparatus receives the packet data from the information communication apparatus. Conditions on the basis of the additional information to be received are stored in association with process instruction information. A condition which can be satisfied by the additional information received from the information communication apparatus is searched from among the stored conditions. If a condition which can be satisfied by the additional information is present, predetermined feature information of the packet data received from the information communication apparatus is extracted, the packet data is processed on the basis of the process instruction information associated with the condition, and the extracted feature information is stored in association with the process instruction information.

4 Claims, 5 Drawing Sheets

(56) References Cited

U.S. PATENT DOCUMENTS

2010/0222037 A1* 9/2010 Dragt .................. G06Q 30/02
455/414.1
2011/0261825 A1* 10/2011 Ichino .................. H04L 45/38
370/400

* cited by examiner

FIG. 3

| Condition Regarding Additional Information | Process Instruction Information |
|---|---|
| YouTube | Transmit through Communication Port 230x |
| MoviePlayer | Transmit through Communication Port 230x |
| aaaaa | Discard |
| ⋮ | ⋮ |

| Feature Information (information, etc., included in header) | Process Instruction Information |
|---|---|
| Destination: β | Transmit through Communication Port 230x |
| ⋮ | ⋮ |

INFORMATION TRANSMISSION SYSTEM, INFORMATION COMMUNICATION APPARATUS, AND INFORMATION TRANSMISSION APPARATUS

CROSS-REFERENCES TO RELATED APPLICATION

This application claims priority from Japanese Patent Application Serial No. 2014-017959 filed Jan. 31, 2014, the contents of which are incorporated herein by reference in its entirety.

FIELD OF ARTS

The present disclosure relates to an information transmission system, an information communication apparatus, and an information transmission apparatus, which transmits information.

BACKGROUND ARTS

Recently, in order to satisfy the desire to dynamically change the network structure, etc., research and development have been performed for Software Defined Network (SDN) which can dynamically control data transmission paths on a network by a software.

As an example, in an SDN referred to as OpenFlow, a switch apparatus arranged on a network performs a data transmission process in accordance with commands from a controller arranged at the center. In OpenFlow, the controller transmits a pattern regarding information included in the header of packet data, and a process which should be executed regarding the packet data which includes the pattern in the header thereof, to the switch apparatus side. In the switch apparatus, the pattern and the process are stored to be associated with each other. Also, the switch apparatus refers to the header of the input packet data, and when the header matches the pattern designated by the controller, the switch apparatus executes the process associated with the pattern.

The header of the packet data includes information which identifies the communication flow of the packet data, specifically, identification information of a reception port, a transmission source MAC (Media Access Controller) address, destination MAC address, VLAN (Virtual Local Area Network) information, a transmission source IP address, a destination IP address, a transmission source port number, a destination port number, etc.

As for the process which should be executed, a process to transmit packet data through a specific port, a discarding process, a process to rewrite header information, etc., may be designated, and executed by the switch apparatus (WO 2010/103909).

However, according to the conventional SDN technology such as the above-mentioned OpenFlow, packet data is controlled on the basis of the information identifying the communication flow of the packet data, namely, the header information, and thus, setting therefor is not usually easy. For example, in order to set the transmission path for the packet data from a video delivery site to be different from the transmission path for the packet data from other sites, an administrator should be previously informed of the IP address of the video delivery site, and thus, this is inconvenient to perform setting.

In order to deal with the case where the IP address of the communication destination is not always fixed, such as the case of peer-to-peer communication, setting on the basis of the header information may be difficult. Further, if the communication path control can be performed on the basis of an application at the transmission source terminal, operation status of a user, the geographical location of the terminal, and the like, such control can be applied in a wide range. However, at present, the application type is not recorded in the header, and thus, under the present circumstances, the control cannot be performed at the network device side.

SUMMARY OF DISCLOSURE

The present disclosure has been created in view of the above, and one of the objectives the present disclosure is to provide an information transmission system, an information communication apparatus, and an information transmission apparatus, in which settings regarding data transmission control can be set easily.

In order to solve above drawbacks of the prior arts, the present disclosure discloses an information transmission system comprising an information communication apparatus and an information transmission apparatus, wherein the information communication apparatus comprises a communication device which transmits/receives packet data relating to communication to/from the information transmission apparatus, a holding device which holds information which can be acquired at the information communication apparatus side, and a device which transmits additional information, additional information being held in the holding device, and the information transmission apparatus comprises, a device which receives packet data from the information communication apparatus, a storage device which stores conditions on the basis of the additional information to be received, in association with process instruction information, and a processing device which executes a first process and a second process, the first process including searching for a condition which can be satisfied by the received additional information, from among the conditions stored in the storage device, if a condition which can be satisfied by the additional information is present, extracting predetermined feature information relating to the packet received from the information communication apparatus, processing the packet data on the basis of the process instruction information which is stored in association with the condition, and storing the extracted feature information in association with the process instruction information, and the second process including extracting predetermined feature information from the packet data received from the information communication apparatus, and if the extracted feature information is stored in association with process instruction information, processing the received packet data on the basis of the process instruction information associated with the stored feature information.

BRIEF DESCRIPTION OF THE DRAWINGS

FIG. 3 is an explanatory view showing an example of a content of a flow setting database held by an information transmission system according to an embodiment of the present disclosure.

PREFERRED EMBODIMENTS

An embodiment of the present disclosure will be explained with reference to the drawings. As exemplified in FIG. 1, an information transmission system according to the present embodiment comprises an information communication apparatus 1 and an information transmission apparatus 2. The information communication apparatus 1 and the information transmission apparatus 2 are communicably connected with each other through a gateway apparatus or a network. According to an example of the present embodiment, the information communication apparatus 1 is a mobile terminal (smartphone, etc.) capable of performing data communication through a network, and the information transmission apparatus 2 is, for example, a network switch.

Figure 1:
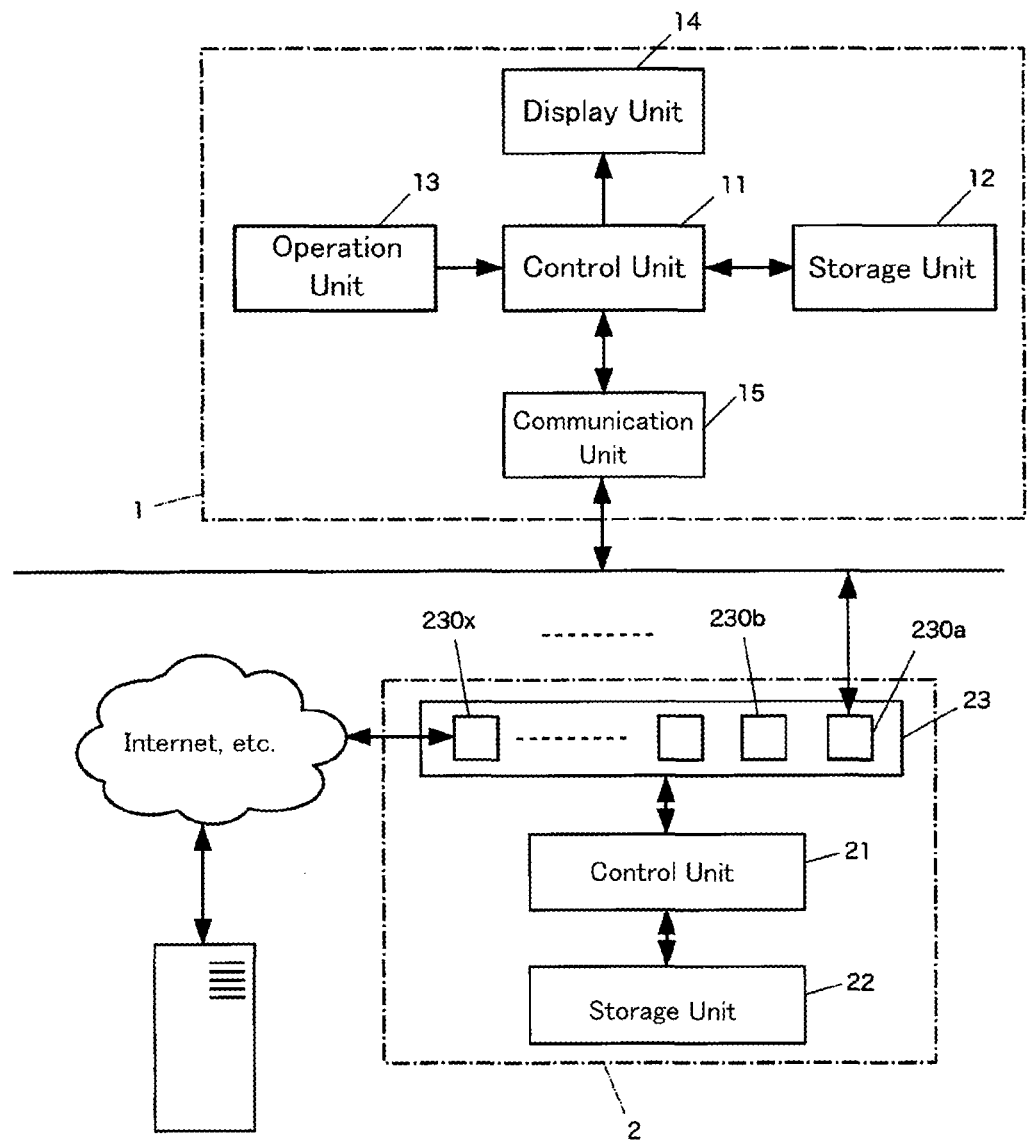
FIG. 1 is a block diagram showing a constitutional example of an information transmission system according to an embodiment of the present disclosure.

As exemplified in FIG. 1, the information communication apparatus 1 according to an example of the present embodiment comprises a control unit 11, a storage unit 12, an operation unit 13, a display unit 14, and a communication unit 15. The information transmission apparatus 2 comprises a control unit 21, a storage unit 22, and a communication unit 23 provided with a plurality of communication ports 230a, 230b, . . . .

The control unit 11 is a program control device such as a CPU, and operates in accordance with a program stored in the storage unit 12. The control unit 11 according to the present embodiment executes essential processes as the information communication apparatus 1 (for example, if the information communication apparatus 1 is a smartphone, processes may include receiving incoming calls, originating calls, etc.), and in addition, performs communication with the information transmission apparatus 2. Here, the communication refers to, specifically, socket communication (for example, communication using a BSD socket, or API (Application Program Interface) compatible thereto) (IEEE Std. 1003.1-2001 Standard for Information Technology—Portable Operating System Interface (POSIX)). In the socket communication, an application program (hereinafter, simply referred to as an application) transmits/receives packet data through at least one socket (virtual communication interface).

Further, the control unit 11 acquires information which can be acquired by the information communication apparatus 1 (the information being different from the data itself to be transmitted by the application), and holds the acquired information by storing in the storage unit 12. Specifically, the information which can be acquired is information relating to the communicating socket, for example, the name of the application which performs communication using the communicating socket, process status (whether process being executed in foreground or background, or the process being idle, suspended, etc.), a user name of the application which is being executed, the geographical location information of the terminal, and the like. Further, upon performing communication, the control unit 11 adds the information which has been held, to at least one piece of packet data to be transmitted, as additional information, and transmits the packet data added with the additional information. The detailed operations of the control unit 11 will be described below.

The storage unit 12 may be a memory device, a disk device, etc., and holds a program to be executed by the control unit 11. The program may be stored in a non-transitory computer readable recording medium such as a DVD-ROM, etc., and copied to the storage unit 12. According to the present embodiment, the storage unit 12 also operates as a work memory of the control unit 11.

The operation unit 13 is a touch panel, etc., which receives the operations by the user, and outputs the content of the operations to the control unit 11. The display unit 14 is a display, etc., which displays and outputs information in accordance with the commands input from the control unit 11. The communication unit 15 is a network interface, etc., communicating through a wireless LAN (Local Area Network), which transmits packet data through a network in accordance with the commands input from the control unit 11. Also, the communication unit 15 receives packet data addressed to the communication unit 15 itself arriving through the network, or broadcasted packet data, and outputs the received packet data to the control unit 11.

Figure 2:
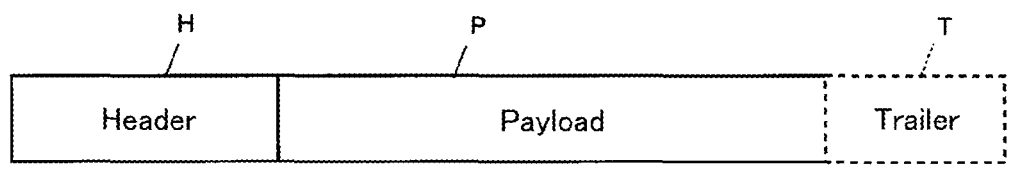
FIG. 2 is an explanatory view showing an example of a content of packet data to be transmitted/received by an information transmission system according to an embodiment of the present disclosure.

The control unit 21 of the information transmission apparatus 2 is a program control device such as a CPU, and operates in accordance with a program stored in the storage unit 22. The control unit 21 according to the present embodiment receives packet data through any one of the communication ports 230 of the communication unit 23, and performs processes described below. Here, as exemplified in FIG. 2, the packet data includes a header (H) and a payload (P). A trailer (T) may be added to the packet data.

The header includes information for identifying the communication flow of the packet data, specifically, identification information of the reception port, a transmission source MAC (Media Access Controller) address, a destination MAC address, VLAN (Virtual Local Area Network) information, a transmission source IP address, a destination IP address, a transmission source port number, a destination port number, and the like. The payload includes user data. Here, the user data is, for example, in case of the data requesting the URL ht.. ://aaa.bbb.ccc/ddd by HTTP protocol, the user data includes a command character string such as "GET ht.. ://aaa.bbb.ccc/ddd".

The control unit 21 of the present embodiment receives packet data from the information communication apparatus 1, and if the received packet data is added with the additional information, the control unit 21 performs the following processes. Namely, the control unit 21 searches whether or not the additional information added to the received packet data satisfies any one of the conditions based on the additional information, the conditions being stored in the storage unit 12 described below. If the additional information satisfies any one of the conditions, the control unit 21 extracts predetermined feature information relating to the packet data added with the relevant additional information. As an example, the feature information is usually referred to as flow information, which is a combination or a part of information included in the header and necessary for specifying the communication between the transmission source and the transmission destination. For example, in case of OpenFlow (OpenFlow 1.3), 40 pieces of information included in the header are used for flow information. In the present example, the flow information may be used as feature information, as in the case of OpenFlow. When a plurality of communication sessions are handled together, only a part of the information included in the header may be designated as flow information. Namely, in this case, the feature information may be, for example, a transmission source IP address itself or a destination IP address itself, as information included in the header (H), etc. The control unit 21 reads out process instruction information which is stored in the storage unit 22 in association with the condition satisfied by the relevant additional information, processes the received packet data in accordance with the read-out process instruction information, and stores the extracted feature information in association with the read-out process instruction information (First Process).

When the control unit 21 receives packet data from the information communication apparatus 1, regardless of whether or not any additional information is added to the packet data (as far as processes according to the process instruction information has already been performed in the First Process, the following processes do not have to be performed), the control unit 21 extracts predetermined feature information from the received packet data. This feature information is the same as the feature information extracted in the First Process. When feature information same as the extracted feature information is stored, the control unit 21 processes the received packet data on the basis of the process instruction information associated with the stored feature information (Second Process). The specific processes of the control unit 21 will also be described below.

The storage unit 22 may be a memory device, a disk device, etc., and holds a program to be executed by the control unit 21. The program may be stored in a non-transitory computer readable recording medium such as a DVD-ROM, etc., and copied to the storage unit 22.

In the present embodiment, as exemplified in FIG. 3, the storage unit 22 stores a flow setting database, in which each process instruction information is associated with each of a plurality of conditions relating to the additional information added by the information communication apparatus 1. Specifically, when the name of the application is used for the additional information, for example, with respect to the condition that the application name includes "YouTube" (YouTube is a registered trademark) such as YouTube video replay application, process instruction information instructing to transmit packet data through a specific communication port 230n is associated and stored, whereas with respect to the condition that the application name includes a name of a web browser (such as Chrome), process instruction information instructing to transmit packet data through another communication port 230m is associated and stored.

The storage unit 22 also operates as a work memory of the control unit 21, and stores the feature information in association with the process instruction information.

The communication unit 23 is a network interface, etc., and in the present embodiment, the communication unit 23 comprises a plurality of communication ports 230a, 230b, . . . . The communication unit 23 adds packet data which has arrived to any one of the communication ports 230 with information for identifying the communication port which has received the packet data (reception port identification information), and outputs the packet data after the addition to the control unit 21. Also, when the communication unit 23 receives packet data together with the information specifying any one of the communication ports 230, from the control unit 21, the communication unit 23 transmits the packet data through the communication port 230 specified by the information.

Next, operations of the control unit 11 according to the present embodiment will be explained. As exemplified in FIG. 4, the control unit 11 according to the present embodiment functionally comprises an information acquisition unit 31, an information holding unit 32, a packet data generation unit 33, and a socket communication unit 34.

The information acquisition unit 31 acquires information which can be acquired by the information communication apparatus 1 (the information being different from the data to be transmitted by an application). Here, as an example of such information, information relating to a socket used for the communication is acquired. In the present example, the information acquisition unit 31 uses netstat command or lsof command, and acquires information specifying an open socket (including a socket under the state of LISTEN (standby), CLOSE_WAIT (waiting for closure), or the like) (the information including an IP address and a port number of the information communication apparatus 1 which is a transmission source), and the name of an application performing communication using each socket. The information acquisition unit 31 may be implemented as a function of the kernel of the operating system. In this case, various types of information may be acquired not by command execution, but by a system call program, or may be acquired by reading out information managed by the kernel.

The information holding unit 32 stores information acquired by the information acquisition unit 31. Specifically, in the present example, each information specifying a socket is associated with the name of application which performs communication using the socket specified by the relevant information, and stored in the storage unit 12.

The packet data generation unit 33 receives, from the application side, the information specifying the socket and the data to be transmitted. Then, the packet data generation unit 33 divides the received data into a plurality of pieces of packet data. The packet data generation unit 33 adds at least one of the pieces of the packet data obtained by the division, with information held by the information holding unit 32, as additional information. As mentioned above, if the information holding unit 32 holds each information specifying a socket in association with the name of application which performs communication using the socket specified by the relevant information, the packet data generation unit 33 adds at least one of the pieces of the packet data obtained by the division, with information relating to the socket which is to be used when the relevant packet data is transmitted (for example, name of the application), as the additional information. Here, the additional information may be included in, for example, the trailer, or the payload if the payload is empty (the data size is "0"). The additional information may be defined as an option of the IP header, and included in the IP header. The packet data generation unit 33 outputs the generated packet data (including the packet data added with the additional information), and the socket specifying information which has been received from the application side together with the original data of the packet data.

The socket communication unit 34 receives the packet data and the socket specifying information from the packet data generation unit 33, and sequentially transmits each piece of the packet data through the socket specified by the information.

According to an example of the present embodiment, upon initiating socket communication using TCP (Transmission Control Protocol), the information communication apparatus 1 adds the leading packet data (the packet which is transmitted first after the socket open, and when the communication is initiated) with the information relating to the socket. In the communication using TCP, this leading packet data is referred to as SYN packet data, which is packet data having no data in the payload (the data size of the payload is "0").

Figures 5, 6:
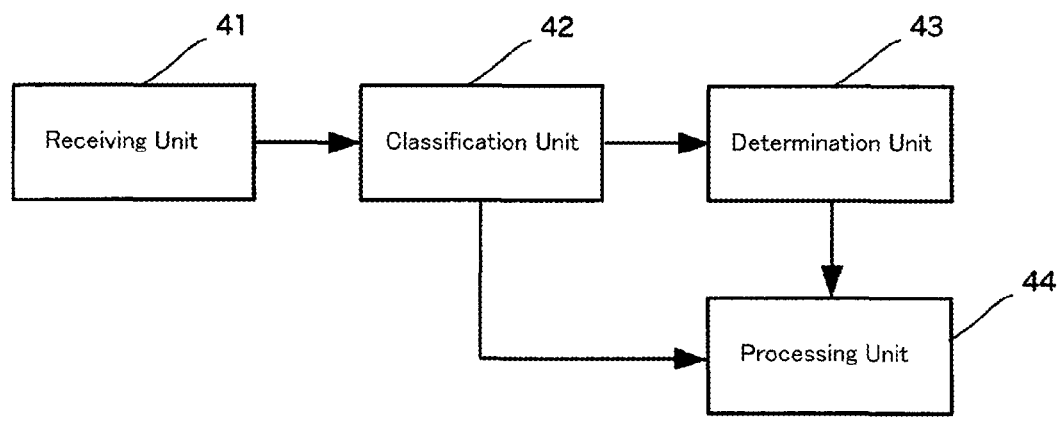
FIG. 5 is a functional block diagram showing an example of an information transmission apparatus according to an embodiment of the present disclosure.
FIG. 6 is an explanatory view showing an example of a content of a communication flow database stored in the information transmission apparatus according to an embodiment of the present disclosure.

Next, operations of the control unit 21 in the information transmission apparatus 2 will be explained. As exemplified in FIG. 5, the control unit 21 functionally comprises a receiving unit 41, a classification unit 42, a determination unit 43, and a processing unit 44.

The receiving unit 41 receives packet data arrived through any one of the communication ports 230 of the communication unit 23. The classification unit 42 extracts predetermined feature information from the packet data received by the receiving unit 41, and performs the following processes. According to an example of the present embodiment, the predetermined feature information to be extracted from the packet data is at least either of the information specifying the transmission source of the packet data, or the information specifying the transmission destination of the packet data. These types of information are included in the header (H) of the packet data as a transmission source IP address and a destination IP address According to this example of the present embodiment, due to the processes described below, as exemplified in FIG. 6, a communication flow database is stored in the storage unit 22, the communication flow database including at least one combination consisting of the information included in the header (H) as the feature information (for example, the transmission source IP address or the destination IP address) and the process instruction information associated thereto. Here, the process instruction information may be, for example, an instruction to transmit the packet data through a specific communication port 230, an instruction to discard the packet data, an instruction to rewrite the header information, or the like.

The classification unit 42 according to the present example examines whether or not additional information is included in the packet data received by the receiving unit 41. For example, if the additional information is included in the trailer, the classification unit 42 should only examine whether or not the packet data received by the receiving unit 41 includes the trailer. Alternatively, it may be determined to add the additional information always to the SYN packet which is transmitted first in the communication using TCP, so that the classification unit 42 should detect the additional information from the SYN packet. As another method, additional information may be always added to the trailer of all pieces of packet data to be transmitted by the information communication apparatus 1. In this case, the gateway apparatus which relays the packet data transmitted by the information transmission apparatus 2 detects the trailer, performs determination, and thereafter, deletes the trailer before transmission, so that in the network apparatus which is to be passed in the communication thereafter (such network apparatus may malfunction if the trailer is present), the communication is performed without the trailer. When the packet data received by the receiving unit 41 is determined as being added with the additional information, the classification unit 42 outputs the packet data to the determination unit 43 as the packet data to be processed.

When no additional information is included in the packet data received by the receiving unit 41, the classification unit 42 examines whether or not the information included in the header of the packet data is held in the communication flow database. If any process instruction information is associated with the information included in the header, and held in the communication flow database in the storage unit 22, the classification unit 42 reads out the relevant process instruction information (the process instruction information associated with the information included in the header), and outputs the received packet data and the read-out process instruction information to the processing unit 44. Namely, the classification unit 42 executes the Second Process of the present disclosure. If the information in the header which has been referred to is not held in the communication flow database of the storage unit 22, the classification unit 42 outputs the packet data as is to the processing unit 44.

Further, if the information included in the header of the packet data received by the receiving unit 41 is held in the communication flow database, and also, the received packet data includes information representing the end of the series of communication (in case of the communication using TCP, FIN packet data), the classification unit 42 may delete the relevant data held in the communication flow database (the information included in the header of the packet data received by the receiving unit 41, and the process instruction information associated thereto), from the communication flow database.

The determination unit 43 receives, from the classification unit 42, the input of the packet data to be processed, from among the packet data received by the receiving unit 41. Then, the determination unit 43 extracts the additional information from the packet data to be processed.

In the present embodiment, a flow setting database is previously stored in the storage unit 22, the flow setting database holding a condition on the basis of the additional information added to the received packet data in association with the process instruction information. As exemplified in FIG. 3, the flow setting database includes a condition on the basis of the additional information in association with the process instruction information. Here, as mentioned above, the condition on the basis of the additional information is, for example, an application name itself. The condition may be a pattern regarding the additional information (for example, regular expression pattern, etc.).

The flow setting database is rewritable by the administrator. Specifically, the control unit 21 externally (for example, from a personal computer, etc., connected through any one of the communication ports 230 or through an interface such as an USB (Universal Serial Bus) which is not shown in the drawings) receives a flow setting database rewriting instruction, and in accordance with the instruction, performs processes such as storing the condition on the basis of the additional information in association with the process instruction information in the flow setting database, deleting an entry having the condition on the basis of any of the additional information in association with the process instruction information from the flow setting database, or the like. Further, similar to the OpenFlow, the flow setting database may be rewritten in response to the instruction from the controller. In this case, the control unit 21 receives an instruction from the controller through a network connected through any one of the communication ports 230, and in accordance with the instruction, rewrites the flow setting database.

The determination unit 43 searches for a condition to be satisfied by the additional information extracted from the packet to be processed, from among the conditions stored in the flow setting database of the storage unit 22. For example, if an application name itself is directly stored in the flow setting database as a condition, the determination unit 43 examines whether an application name which is identical with the application name included in the extracted additional information is stored in the flow setting database. If there presents a condition satisfied by the additional information, the determination unit 43 reads out the process instruction information associated with the relevant condition.

The determination unit 43 also extracts feature information from the packet data to be processed. Here, the type of the feature information to be extracted is the same as the type of the information handled by the classification unit 42. Namely, according to an example of the present embodiment, information such as a transmission source IP address, a destination IP address, etc., included in the header, is extracted. The determination unit 43 outputs the read-out process instruction information and the packet data to be processed, to the processing unit 44. The determination unit 43 also associates the extracted feature information (here, the information included in the header) with the read-out process instruction information, and stores the associated information in the communication flow database by adding thereto. Namely, according to the present embodiment, this determination unit 43 executes the First Process of the present disclosure. Once the feature information is extracted, the process using the trailer is not necessary (because in the network apparatuses to be passed for communication thereafter, this feature information is shared, and thereby, the communication can be controlled). Accordingly, the information transmission apparatus 2 may remove the trailer at this point.

The processing unit 44 basically operates as an ordinary switch, or an SDN switch such as an OpenFlow switch. Namely, with respect to each communication port 230a, 230b, . . . , the processing unit 44 stores the transmission source MAC address of the packet data externally arriving to each communication port 230 by associating each MAC address with each communication port (Learning). Then, the processing unit 44 refers to the header of the input packet data, and transmits the packet data through the communication port 230 associated with the destination MAC address contained in the relevant header (Forwarding). Further, if the destination MAC address included in the header of the input packet data is not associated with any one of the communication ports 230, the processing unit 44 transmits the packet data through all of the communication ports 230 (Flooding). In addition, the processing unit 44 may perform operations as an ordinary switch such as filtering, aging, or may perform operations as an SDN switch such as an OpenFlow switch (subjecting the flow information to a pattern matching process, and executing a preset process to the packet data matched with the condition).

Also, upon receiving the input of the packet data together with the process instruction information, from the classification unit 42 or the determination unit 43, the processing unit 44 according to the present embodiment executes a process specified by the process instruction information, such as transmitting the packet data through the specific communication port 230, discarding the relevant packet data, or the like.

Specifically, if the process instruction information input with the packet data from the classification unit 42 or the determination unit 43 represents the transmission of the packet data through a specific communication port 230x, the processing unit 44 transmits the input packet data through the designated specific communication port 230x.

The information transmission system according to the present embodiment is structured as above, and, by way of example, operates as below. In the following example, the information transmission apparatus 2 is communicably connected to the information communication apparatus 1 through the communication port 230a, the communication port 230x is connected to the Internet through a comparatively low speed network, and the communication port 230y is connected to the Internet through a comparatively high speed network, the communication port 230y being set as a default transmission destination.

Supposing that an application having a name represented by a character string "MoviePlayer" is set as Entry (A) in the flow setting database of the storage unit 22, as a condition relating to the additional information, the application functioning to acquire video data from a computer on the network and playback the acquired video data. In association with this condition, process instruction information instructing the transmission through the specific communication port 230x, is set.

In this example, when a user of the information communication apparatus 1 accesses a server having an IP address α, using a browser (the application name of the browser is not "MoviePlayer"), SYN packet data P1 having, in the header thereof, α as a destination IP address, and subsequent packet data P2, P3, . . . , including user data for requesting data, are generated. The information communication apparatus 1 opens a socket, and transmits the generated packet data through the opened socket.

Further, the information communication apparatus 1 repeatedly executes processes such as netstat, lsof, and the like, at a predetermined interval, and acquires and records socket information. As the information relating to the socket which has been opened during the operation as the browser, the information communication apparatus 1 acquires, for example, information specifying the socket (a combination of an IP address and a port number of the information communication apparatus 1) and the application name of the browser.

The information communication apparatus 1 includes the information relating to the socket in, for example, the payload (essentially, the data size thereof being "0") of the SYN packet data P1, and transmits the resulting information to the information transmission apparatus 2. Also, the information communication apparatus 1 sequentially transmits the subsequent packet data P2, P3, . . . .

Figure 7:
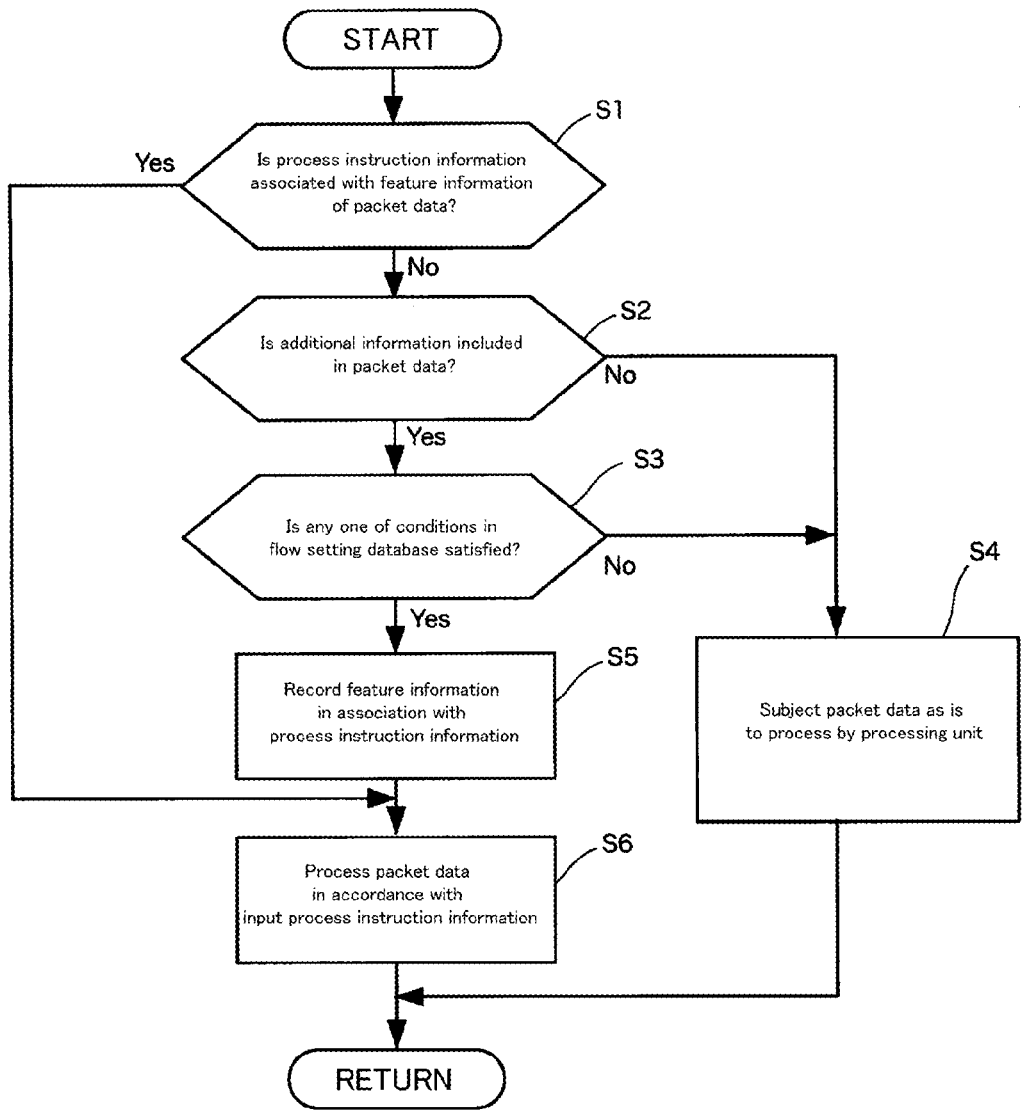
FIG. 7 is a flowchart expressing an operation example of an information transmission apparatus according to an embodiment of the present disclosure.

The information transmission apparatus 2 receives the packet data P1, P2, . . . , through the communication port 230a. Then, the control unit 21 of the information transmission apparatus 2 starts to operate as the classification unit 42. Namely, as exemplified in FIG. 7, the control unit 21 refers to the communication flow database, and examines whether or not a combination of the feature information (here, the destination IP address included in the header) of the packet data and the process instruction information associated thereto is held (S1).

If such a combination is not held (No in S1), the control unit 21 examines whether or not any additional information is held in the packet data P1 (S2). If it has been previously determined to include the additional information in the payload when the packet data P1 is SYN packet data, the control unit 21 examines whether or not the packet data P1 is the SYN packet data. Here, the packet data P1 is the SYN packet data, and thus, the control unit 21 determines that the additional information is included (determines that Step S2 is Yes), and starts to operate as the determination unit 23.

As the operation of the determination unit 43, the control unit 21 extracts the additional information from the payload of the received packet data P1, and then, searches the flow setting database to find out a condition which can be satisfied by the extracted additional information, from among the conditions stored in the flow setting database of the storage unit 22. Specifically, as the condition which can be satisfied by the additional information, a condition having an application name same as the name in the additional information is retrieved (S3).

If no entry having the application name of the browser in association with the process instruction information is recorded in the flow setting database (Step S3 is No), the control unit 21 subjects the received packet data as is to the process in the processing unit 44 (S4).

In this case, the control unit 21 operates as the processing unit 44, and transmits the received packet data P1 through the communication port 230y, which is the default transmission destination, to the Internet side. At this time, the control unit 21 may remove the additional information (return the payload of the packet data P1, i.e., the SYN packet data, to the original empty state) before transmitting the packet data P1.

The subsequent packet data P2, P3, . . . , is not added with the additional information, and thus, the control unit 21 subjects the packet data P2, P3, . . . , as is to the process of the processing unit 44 in the operation of Step S2. Namely, all of the subsequent packet data P2, P3, . . . , is transmitted through the communication port 230y, i.e., the default communication port, to the Internet side (Step S4). Here, if the processing unit 44 operates as an SDN switch such as an OpenFlow switch, the packet data may be transmitted through a communication port which has been determined by a set process.

On the other hand, when a user of the information communication apparatus 1 accesses a server having an IP address β, using an application for viewing a video (the application name thereof is "MoviePlayer"), the information communication apparatus 1 generates SYN packet data P'1 having, in the header thereof, β as a destination IP address, and subsequent packet data P'2, P'3, . . . , including user data for requesting the data. The information communication apparatus 1 opens a socket, and transmits the generated packet data through the opened socket.

The information communication apparatus 1 repeatedly executes processes such as netstat, lsof, and the like, at a predetermined interval, and acquires and records socket information. As the information relating to the socket which has been opened during the operation as the application having the application name "MoviePlayer", the information communication apparatus 1 acquires, for example, information specifying the socket (a combination of an IP address and a port number of the information communication apparatus 1) and the application name "MoviePlayer".

The information communication apparatus 1 includes the information relating to the socket in, for example, the payload (essentially, the data size thereof being "0") of the SYN packet data P'1, and transmits the resulting information to the information transmission apparatus 2. The information communication apparatus 1 sequentially transmits the subsequent packet data P'2, P'3, . . . .

The information transmission apparatus 2 receives the packet data P'1, P'2, . . . , through the communication port 230a. Then, the control unit 21 of the information transmission apparatus 2 starts to operate as the classification unit 42. Namely, as exemplified in FIG. 7, the control unit 21 refers to the communication flow database, and examines whether or not a combination of the feature information (here, the destination IP address included in the header) of the packet data and the process instruction information associated thereto is held (S1).

If such a combination is not held (No in S1), the control unit 21 examines whether or not any additional information is included in the packet data P'1 (S2). If it has been previously determined to include the additional information in the payload when the packet data P'1 is SYN packet data, the control unit 21 examines whether or not the packet data P'1 is the SYN packet data. Here, the packet data P'1 is the SYN packet data, and thus, the control unit 21 determines that the additional information is included, and starts to operate as the determination unit 43.

As the operation of the determination unit 43, the control unit 21 extracts the additional information from the payload of the received packet data P'1, and then, searches the flow setting database to find out a condition which can be satisfied by the extracted additional information, from among the conditions stored in the flow setting database of the storage unit 22. Specifically, as the condition which can be satisfied by the additional information, a condition having an application name same as the name included in the additional information is retrieved (S3).

If an entry having the application name "MoviePlayer" in association with the process instruction information "instructing to transmit the data through the communication port 230x" is recorded in the flow setting database (Step S3 is Yes), the control unit 21 extracts the destination IP address included in the header as the feature information, from the packet data P'1, and stores the extracted destination IP address in association with the process instruction information representing the instruction to transmit the data through the communication port 230x, in the communication flow database (S5).

The control unit 21 subjects the received packet data P'1 and the process instruction information representing the instruction to transmit the data through the communication port 230x, to the process as the processing unit 44 (S6). Then, as the process of the processing unit 44, the control unit 21 transmits the received packet data P'1 through the communication port 230x to the Internet side, in accordance with the process instruction information. At this time, the control unit 21 may remove the additional information (return the payload of the packet data P'1, i.e., the SYN packet data, to the original empty state) before transmitting the packet data P'1.

With respect to the subsequent packet data P'2, P'3, . . . , according to the process in Step S5, a destination IP address (corresponding to the feature information) included in each header is held in the communication flow database. Then, in the operation of Step S1, the control unit 21 reads out the process instruction information associated with the destination IP address from the communication flow database, and subjects the process instruction information and the packet data P'2, P'3, . . . to the process as the processing unit 44 (S6). Then, the control unit 21 performs the process as the processing unit 44, to transmit the packet data P'1 through the communication port 230x to the Internet side, according to the process instruction information.

Thereafter, upon receiving FIN packet data provided in its header with the IP address β as the destination IP address, the control unit 21 deletes the destination IP address and the process instruction information associated thereto, from the communication flow database.

According to the operational example of the present embodiment, the packets transmitted from the application dedicated to playback videos are purposely transmitted through a network communicating at a comparatively slow communication speed, to decrease the communication quality. Thereby, for example, in a network environment of a school, etc., the transmission of packets having less relationship with lessons, can be restrained from being transmitted.

In the example described here, the additional information is included in the payload of the SYN packet data. Because the packet data which has no data in its payload and which is always transmitted at the start of a session, is used, transmitting packet data having an increased packet data length is not necessary, and thus, this example is applicable in the network where the maximum value of the packet data length (MTU) is defined to be comparatively small.

In the above explanation, the example using TCP has been mainly described. However, as far as the socket communication is performed, UDP (User Datagram Protocol) may be used, or other protocol may also be used.

[Example Using Different Proxies]

In the above explanation, the process instruction information stored in the flow setting database may include information specifying a web proxy or a mail proxy (hereinafter, collectively referred to as a proxy) and an instruction for transmitting/receiving information using the proxy specified by the information. Specifically, when the application name is used as the additional information, for example, a condition that the application name includes "YouTube" is associated with information specifying a first proxy (URL of the first proxy is sufficient) and process instruction information to transmit/receive information through the first proxy specified by the relevant information, and is stored in the flow setting database; whereas a condition that the application name includes the name of a web browser (such as Chrome) is associated with information specifying a second proxy (URL of the second proxy is sufficient) and process instruction information to transmit/receive information through the second proxy specified by the relevant formation, and is stored in the flow setting database. Accordingly, making each application access a web server, etc., through a different proxy, is possible.

[Example Using Different Networks]

Further, the process instruction information stored in the flow setting database may be an instruction to add a virtual LAN (VLAN) tag. In this case, specifically, information for specifying an application, such as an application name, is used as the additional information. For example, a condition that the application name includes "YouTube" is associated with process instruction information to add first VLAN tag information, and is stored in the flow setting database; whereas a condition that the application name includes the name of a web browser (such as Chrome) is associated with process instruction information to add second VLAN tag information, and is stored in the flow setting database.

In this example, the information transmission apparatus 2 is wired to another switch apparatus etc., supporting tag VLAN (which may be another information transmission apparatus according to the present embodiment) through any one of the communication ports 230, and is connected to a WAN such as the Internet through the another switch apparatus, etc. According to an example of the present embodiment, this communication port 230 is set as a trunk port.

For example, when a user of the information communication apparatus 1 activates a web browser, and transmits packet data to request data to a website on the Internet using the web browser, the information transmission apparatus 2 receives the packet data, adds the second VLAN tag information to the received packet data, and transmits the resulting packet data through the communication port 230 set as a trunk port to the another switch apparatus, etc. The data which is transmitted by the server of the website in response to the above request is received from the another switch apparatus, etc. At this time, the second VLAN tag information is added to the packet data including (each part of) the relevant data. Since this operation is the same as the widely known operation of the tag VLAN, detailed explanation therefor is omitted here.

According to this example of the present embodiment, for example, each application can transmit/receive packet data through a different VLAN. Namely a VLAN can be configured for each application.

[Example Using UDP]

In the above example, upon performing the socket communication using TCP (Transmission Control Protocol), the information communication apparatus 1 adds the information relating to the socket to the leading packet data, i.e., SYN packet data (packet data which is transmitted first after the socket is opened and when the communication is started). In this way, if a protocol by which the leading packet data is distinguishable from other packet data for the information transmission apparatus 2, is used, adding the information relating to the socket, to the leading data is sufficient. However, in some protocols, such as UDP (User Datagram Protocol), etc., distinguishing the leading packet data from other packet data is difficult. In this case, the following measures may be used so that the information transmission apparatus 2 can identify the packet data including the information relating to the socket.

Namely, according to an example of the present embodiment, the information relating to the socket may be added as a TOS (Type of Service) of the packet data. However, some of the widely used network apparatuses delete the TOS field, and thus, when such network apparatuses are used, adding the information relating to the socket to TOS is not appropriate.

Therefore, according to another example of the present embodiment, with respect to the protocol such as the above-mentioned UDP, a port number T0 which is dedicatedly used for transmitting the packet data including the additional information, is determined. Then, this port number T0 is stored in the information communication apparatus 1 and the information transmission apparatus 2. In this example, the information communication apparatus 1 sets the socket having the port number T0 between the information communication apparatus 1 and the information transmission apparatus 2.

Figure 4:
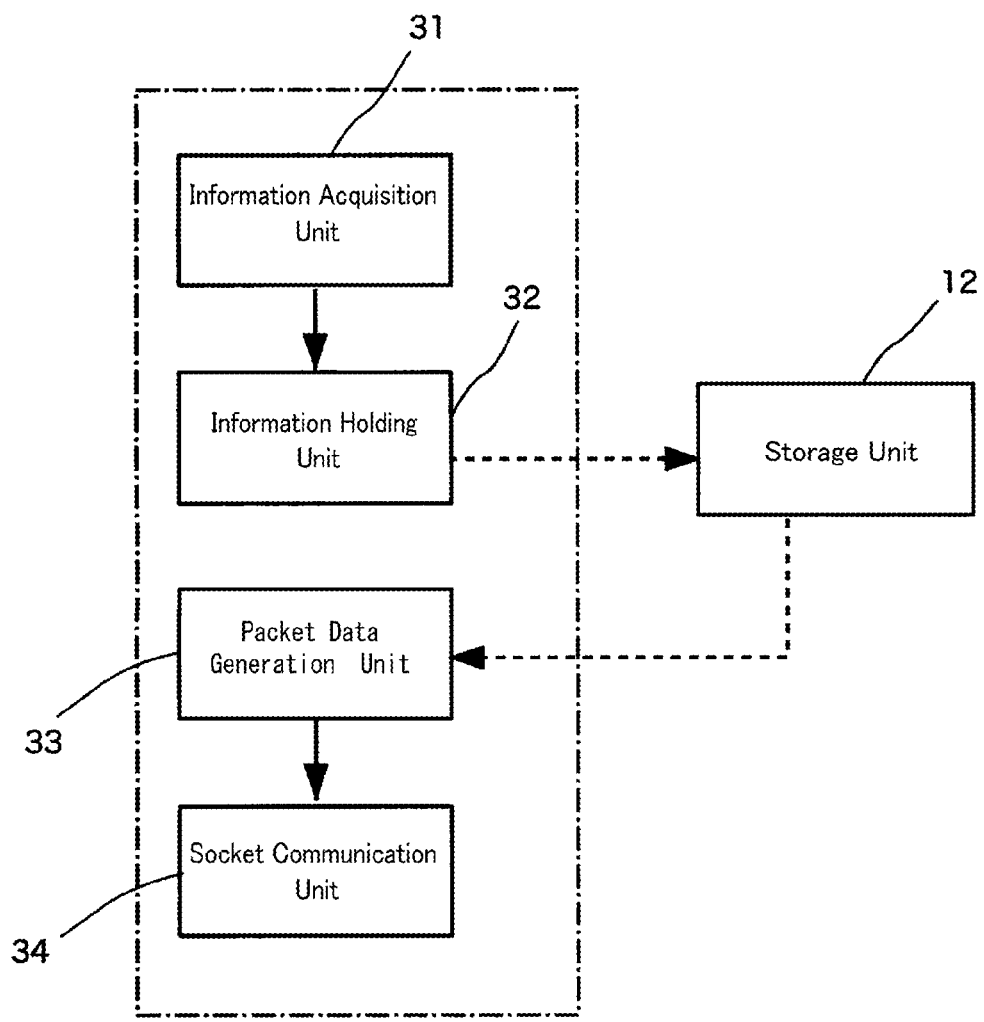
FIG. 4 is a functional block diagram showing an example of an information communication apparatus according to an embodiment of the present disclosure.

In the information communication apparatus 1 according to this example, the control unit 11 has the same functional structure as the structure exemplified in FIG. 4. However, the operations of the packet data generation unit 33 and the socket communication unit 34 are slightly different. Hereinbelow, the operations of the packet data generation unit 33 and the socket communication unit 34 will be explained.

Similar to the example explained above, the packet data generation unit 33 according to this example of the present embodiment receives, from the application side, the socket specifying information and the data to be transmitted. Then, the packet data generation unit 33 divides the received data into a plurality of pieces of packet data. The packet data generation unit 33 adds, as additional information, the information held by the information holding unit 32, to at least one piece of the divided packet data. As mentioned above, if the information holding unit 32 holds each socket specifying information in association with the name of an application which performs communication using each socket specified by the information, the packet data generation unit 33 adds, as additional information, information relating to the socket which is to be used for transmitting the packet data (for example, name of the application), to at least one piece of the divided packet data. Here, the additional information may be included in, for example, the trailer, or the payload if the payload is empty (data size is "0"). The additional information may also be defined as an option of the IP header, and may be included in the IP header. The packet data generation unit 33 outputs the generated packet data (including the packet data added with the additional information) and the socket specifying information which has been received from the application side together with the original data of the packet data, to the socket communication unit 34, the socket specifying information including the IP address of the information communication apparatus 1, i.e., the transmission source, and the port number (which should originally have been used for transmitting/receiving the packet data, and which is usually different from the port number T0).

According to this example of the present embodiment, when the packet data generation unit 33 outputs the packet data added with the additional information, the packet data generation unit 33 also outputs the information representing that the additional information has been added, to the socket communication unit 34. Then, the socket communication unit 34 receives, from the packet data generation unit 33, the packet data and the socket specifying information. Further, upon receiving, from the packet data generation unit 33, the input of the packet data together with the information representing the addition of the additional information, the socket communication unit 34 adds the packet data with the socket specifying information received from the packet data generation unit 33. Similar to the additional information, the socket specifying information may be added to the trailer. Then, the packet data is transmitted through the socket having the port number T0. Thereby, the port number of the destination included in the header of the packet data has become not the port number which should originally have been used for transmitting the packet data (the port number designated by originally), but the port number T0. Further, if the socket communication unit 34 does not receive the input of the information representing the addition of the additional information, together with the packet data, from the packet data generation unit 33, the socket communication unit 34 sequentially outputs each piece of the packet data through the packet specified by the information received from the packet data generation unit 33.

In the information transmission apparatus 2, the classification unit 42 examines whether or not any additional information is included in the packet data received by the receiving unit 41. According to an example of the present embodiment, the packet data added with the additional information is only received through the socket with the port number T0. Thus, the classification unit 42 extracts the additional information from the packet data received through the socket with the port number T0. The classification unit 42 refers to the socket specifying information included in the extracted additional information, reads out the port number which should originally have been used for transmitting/receiving the packet data, rewrites the destination port number included in the header of the packet data to the read-out port number, and outputs the packet data having the written port number to the determination unit 43 so as to be processed therein. If the packet data is received by the receiving unit 41 through the socket having a port number other than the port number T0, the classification unit 42 determines that the additional information is not included, and examines whether or not the information included in the header of the packet data (such as the transmission source port number, the destination port number, etc., included in the header) is held in the communication flow database. Here, if the information included in the header is stored in the communication flow database of the storage unit 22 in association with process instruction information, the classification unit 42 reads out the process instruction information (the process instruction information associated with the information included in the header), and outputs the received packet data and the read-out process instruction information, to the processing unit 44. If the information included in the header which has been referred to, is not held in the communication flow database of the storage unit 22, the classification unit 42 outputs the packet data as is to the processing unit 44.

Further, the classification unit 42 may store each information included in the header and held in the communication flow database, in association with time information representing the last time when the packet data having the information in the header thereof was received. With respect to each information included in the header and held in the communication flow database, the classification unit 42 examines whether or not a predetermined time has passed since the last time that the packet data having the information in the header thereof was received. If the predetermined time has already passed, the information and the process instruction information associated thereto may be deleted from the communication flow database.

From among the packet data received by the receiving unit 41, the determination unit 43 receives the input of the packet data to be processed from the classification unit 42. Then, the determination unit 43 extracts the additional information from the packet data to be processed.

The determination unit 43 searches for a condition which can be satisfied by the additional information extracted from the packet data to be processed, from among the conditions stored in the flow setting database of the storage unit 22. For example, if the application names themselves are stored in the flow setting database, the determination unit 43 examines whether or not the application name included in the extracted additional information matches any one of the application names stored in the flow setting database. If a condition satisfied by the additional information is present, the determination unit 43 reads out the process instruction information associated with the relevant condition.

Further, the determination unit 43 extracts feature information from the packet data to be processed. Here, the extracted feature information is the same type of information as the information handled in the classification unit 42. Namely, in the present example, the information such as a transmission source port number, a destination port number, etc., included in the header, is extracted. The determination unit 43 outputs the read-out process instruction information and the packet data to be processed, to the processing unit 44. Also, the determination unit 43 associates the extracted feature information (here, the information included in the header) with the read-out process instruction information, and adds and stores the resulting information in the communication flow database. Once the feature information is extracted, no process using the additional information is necessary, (because the feature information can be shared among the network apparatuses which are to be passed thereafter in communication, and thus, the communication can be controlled). Accordingly, the information transmission apparatus 2 may delete the additional information. In the example of the present embodiment, even if the UDP is used, the packet data including the additional information can be identified for sure.

[Modified Example]

In the explanation above, the information relating to the socket, which is included in the additional information, is the application name. However, the present embodiment is not limited thereto. For example, the information relating to the socket may not only the name of the application using the socket, but may include the processing state of the application. Here, the processing state is information representing that the application can immediately receive the input of instructions from a user (Foreground), the application cannot immediately receive the input (Background), or the like, and the information can be acquired by the information communication apparatus 1 using, for example, a process command (ps command).

When such information is used, the information transmission apparatus 2 may perform processes such that the packet data transmitted by a mail application operating in the background be transmitted through a comparatively low speed network, and that the packet data transmitted by any application under the exiting process (wait or zombie process) be discarded.

In the above examples, the information relating to the socket is acquired by another process such as netstat, lsof, etc. However, the information relating to the socket may be acquired by a kernel or a service of the operating system. For example, a library implemented with the socket may manage the application name, etc., which has opened the socket.

In addition, information included in the additional information by the information communication apparatus 1 (information which can be acquired by the information communication apparatus 1) may not only be the information relating to the socket. Instead of the information relating to the socket, or on top of the information relating to the socket, the information may include information relating to an apparatus. The information relating to an apparatus may include at least one of a model name of the information communication apparatus 1, a device type (whether the device is a smartphone, a personal computer, or the like), a remaining battery level (when driven by a battery), terminal inherent information (IMEI in a mobile phone, individual identification information applied by a carrier, and the like), an operation history of a user, an action history (for example, information obtained by Motion Coprocessor of iPhone (registered trademark) 5s of Apple Inc.), ON/OFF of each communication interface (physical interface), a type of connected external apparatus, a type or capacity of mounted storage medium, or the like. In addition, when position information is available by GPS (Global Positioning System), etc., the position information a user, such as the position information itself, the number of GPS satellites capable of receiving signals, etc., may be included in the additional information in addition to the information relation to the socket, or in place of the information relating to the socket.

By using such processes, the information transmission apparatus 2 can perform processes such as discarding packets when the user of the information communication apparatus 1 is located outdoors (determined on the basis of fact that the position information obtained by GPS is included in the additional information), transmitting packets through a comparatively low speed line when the user is located outdoors and the remaining battery level is higher than a predetermined threshold value, and the like.

In the above explanation, the additional information obtained by the information communication apparatus 1 is transmitted to the information transmission apparatus 2 by adding the additional information to the packet data transmitted by the information communication apparatus 1 (usually referred to as an inbound method). However, the present embodiment is not limited thereto. If another communication path (which can be a virtual communication path) is present, the additional information may be transmitted from information communication apparatus 1 to the information transmission apparatus 2, through the another communication path (usually referred to as an outbound method). Such an example using another communication path may be realized by, for example, implementing Open vSwitch on the information communication apparatus.

Further, in the present embodiment, for example, the information transmission apparatus 2 may perform statistical calculation of traffic information (the amount packet data) with respect to each time slot and each application type, using the information included in the additional information and the information held in the communication flow database. The result of such statistical calculation may be useful for planning a network service.

By using the information transmission apparatus 2 according to the present embodiment, for example, operations such as passing through only the packet data received from the application having a preset application name, changing the content of the flow setting database for each time slot, and the like, are possible. Thereby, processes such that packet data received from a specific terminal during night is not passed through, communication to a specific communication destination using a specific terminal is prevented, and the like, can become possible. Therefore, the so-called parental control can be realized, and the malware attack, etc., can be prevented.

What is claimed is:
1. An information transmission system comprising:
an information communication apparatus; and
an information transmission apparatus,
wherein the information communication apparatus includes
a communication device which transmits/receives packet data relating to communication to/from the information transmission apparatus,
a holding device which holds information which can be acquired at the information communication apparatus side, and
a device which transmits additional information, additional information being held in the holding device, and
the information transmission apparatus includes
a device which receives packet data from the information communication apparatus,
a storage device which stores conditions on the basis of the additional information to be received, in association with process instruction information, and
a processing device which executes a first process and a second process,
the first process including searching for a condition which can be satisfied by the received additional information, from among the conditions stored in the storage device, if a condition which can be satisfied by the additional information is present, extracting predetermined feature information relating to the packet received from the information communication apparatus, processing the packet data on the basis of the process instruction information which is stored in association with the condition, and storing the extracted feature information in association with the process instruction information, and the second process including extracting predetermined feature information from the packet data received from the information communication apparatus, and if the extracted feature information is stored in association with process instruction information, processing the received packet data on the basis of the process instruction information associated with the stored feature information.

2. An information transmission apparatus communicably connected to an information communication apparatus which transmits additional information and packet data, the additional information being information which can be acquired at the information communication apparatus side, the information transmission apparatus comprising:

a device which receives the packet data from the information communication apparatus, a storage device which stores conditions on the basis of the additional information to be received in association with process instruction information, and a control device which executes a first process and a second process;

the first process including searching for a condition which can be satisfied by the received additional information, from among the conditions stored in the storage device, if a condition which can be satisfied by the additional information is present, extracting predetermined feature information relating to the packet received from the information communication apparatus, processing the packet data on the basis of the process instruction information which is stored in association with the condition, and storing the extracted feature information in association with the process instruction information, and the second process including extracting predetermined feature information from the packet data received from the information communication apparatus, and if the extracted feature information is stored in association with process instruction information, processing the received packet data on the basis of the process instruction information associated with the stored feature information.

3. An information transmission apparatus according to claim 2, wherein the feature information is either information which specifies a transmission source of the packet data, or information which specifies a transmission destination of the packet data.

4. An information transmission apparatus according to claim 2, wherein when the control device receives packet data including information which represents the termination of a series of communication, the control device further executes a process of deleting feature information which is stored and is extracted from the packet data, and the process instruction information associated with the feature information.

* * * * *